US009665308B2

(12) United States Patent
Crawford et al.

(10) Patent No.: US 9,665,308 B2
(45) Date of Patent: May 30, 2017

(54) OPTIMIZATION OF THE COPYING OF CHANGE RECORDED DATA BY USING SPARE FLASH CAPACITY

(71) Applicant: INTERNATIONAL BUSINESS MACHINES CORPORATION, Armonk, NY (US)

(72) Inventors: Joshua J. Crawford, Tucson, AZ (US); Paul A. Jennas, II, Tucson, AZ (US); Jason L. Peipelman, Vail, AZ (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 14/643,840

(22) Filed: Mar. 10, 2015

(65) Prior Publication Data

US 2016/0266806 A1 Sep. 15, 2016

(51) Int. Cl.
*G06F 3/06* (2006.01)

(52) U.S. Cl.
CPC ............ *G06F 3/065* (2013.01); *G06F 3/0608* (2013.01); *G06F 3/0683* (2013.01)

(58) Field of Classification Search
CPC ........ G06F 3/065; G06F 12/12; G06F 3/0644; G06F 11/203
See application file for complete search history.

(56) References Cited

U.S. PATENT DOCUMENTS

| | | | | |
|---|---|---|---|---|
| 8,578,110 B2 * | 11/2013 | Fukazawa | ........... | G06F 11/1441 711/154 |
| 8,935,500 B1 * | 1/2015 | Gulati | .................. | G06F 3/0613 711/114 |
| 2008/0162803 A1 * | 7/2008 | Masuo | .................... | G06F 3/061 711/112 |
| 2010/0082931 A1 * | 4/2010 | Hatfield | ................. | G06F 3/067 711/166 |
| 2011/0264878 A1 * | 10/2011 | Blea | ...................... | G06F 3/0607 711/162 |
| 2012/0054329 A1 * | 3/2012 | Gulati | ................. | H04L 67/1002 709/224 |
| 2012/0197842 A1 * | 8/2012 | Marie | ............... | G06F 17/30088 707/639 |
| 2012/0233404 A1 * | 9/2012 | Benhase | ................. | G06F 3/065 711/117 |

(Continued)

*Primary Examiner* — Prasith Thammavong
*Assistant Examiner* — Alex Olson
(74) *Attorney, Agent, or Firm* — Rabindranath Dutta; Konrad Raynes Davda & Victor LLP

(57) ABSTRACT

A command is received to copy a first extent in a source volume to a second extent in a target volume, wherein the source volume and the target volume are in a copy relationship. In response to determining that it takes longer to copy all changed data of the first extent to the second extent than to copy all of the changed data of the first extent to a third extent and to copy all other data from the second extent to the third extent, operations are performed to copy all of the changed data of from the first extent to the third extent and to copy all of the other data from the second extent to the third extent. Operations are also performed to assign the third extent to replace the second extent in the target volume.

20 Claims, 11 Drawing Sheets

(56) References Cited

U.S. PATENT DOCUMENTS

| | | | |
|---|---|---|---|
| 2013/0080704 A1* | 3/2013 | Brown | G06F 3/0608 |
| | | | 711/118 |
| 2014/0351534 A1* | 11/2014 | Crawford | G06F 3/065 |
| | | | 711/162 |
| 2015/0234719 A1* | 8/2015 | Coronado | G06F 11/203 |
| | | | 714/6.3 |
| 2015/0347253 A1* | 12/2015 | Jasrasaria | G06F 11/2094 |
| | | | 714/6.32 |

* cited by examiner

OPTIMIZATION OF THE COPYING OF CHANGE RECORDED DATA BY USING SPARE FLASH CAPACITY

BACKGROUND

1. Field

Embodiments relate to optimization of the copying of change recorded data by using spare flash capacity.

2. Background

A storage controller may be coupled to one or more of a plurality of hosts. The storage controller may manage a plurality of storage devices, such as disk drives, tape drives, flash drives, etc., that are coupled to the storage controller. The plurality of hosts may access data stored in the storage devices via the storage controller.

Host applications that execute in the plurality of hosts may create logical storage volumes, and subsequent to the creation of the logical storage volumes write to logical addresses of the logical volumes. The host applications may also read from logical addresses of the logical storage volumes.

The storage controller assigns physical storage to store data that is stored in the logical storage volumes. For example, the storage controller may assign one or more physical extents to each logical storage volume, where the physical extents may reside in storage devices (such as nearline storage, disk drives, tape drives, flash drives, etc.) coupled to the storage controller. Latency is the time interval between initiating a query, transmission, or process, and receiving or detecting the results, often given as an average value over a large number of events. The storage devices attached to or controlled by a storage controller may have different latencies. In general, a flash storage may have a lower latency than a disk storage or a nearline storage.

A point-in-time copy is a fully usable copy of a defined collection of data that contains an image of the data as it appeared at a single point in time. The copy is considered to have logically occurred at that point in time, but certain mechanisms may perform part or all of the copy at other times. A source volume and a target volume may be referred to be in a point-in-time copy relationship, if the target volume is a point-in-time copy of the source volume.

SUMMARY OF THE PREFERRED EMBODIMENTS

Provided are a method, a system, and a computer program in which a command is received to copy a first extent in a source volume to a second extent in a target volume, wherein the source volume and the target volume are in a copy relationship. In response to determining that it takes longer to copy all changed data of the first extent to the second extent than to copy all of the changed data of the first extent to a third extent and to copy all other data from the second extent to the third extent, operations are performed to copy all of the changed data of from the first extent to the third extent and to copy all of the other data from the second extent to the third extent. Operations are also performed to assign the third extent to replace the second extent in the target volume.

In additional embodiments, in response to determining that it takes longer to copy all of the changed data of the first extent to the third extent and to copy all of the other data from the second extent to the third extent than to copy all of the changed data of the first extent to the second extent, the changed data from the first extent is copied to the second extent.

In further embodiments, wherein a determination is made as to whether a tier of storage in which the third extent resides has enough space to allocate the third extent with adequate space to allow copying of all of the changed data of from the first extent to the third extent and the copying of all of the other data from the second extent to the third extent, prior to performing the copying of all of the changed data from the first extent to the third extent and the copying of all of the other data from the second extent to the third extent.

In still further embodiments, the first extent is maintained in a first type of storage, the second extent is maintained in a second type of storage, and the third extent is maintained in a third type of storage, wherein the third type of storage has a faster response time for reads and writes in comparison to the first type of storage or the second type of storage.

In additional embodiments, the second type of storage is nearline storage or some other type of storage, and the third type of storage is flash storage or another type of storage that has a lower latency than the second type of storage.

In further embodiments, the source volume has a plurality of extents, wherein the extents of the source volume are copied to at least two different types of storage that have different response times for reads and writes.

In certain embodiments, based on the percentage of changed data in the first extent, the first extent is copied to the second extent or the third extent, wherein the copy relationship is a point-in-time copy relationship.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made, There exists a need to ensure the fast copying of change-recorded data from one storage volume to another. There are many situations where spare flash capacity may exist on a storage system. Certain embodiments provide a mechanism for optimizing the utilization of the spare flash capacity on the storage system by determining a time required to copy change recorded data from one storage volume to other. More specifically, certain embodiments determine whether to copy change recorded data from one extent to another based on the calculation of time taken to copy the change recorded data by using a flash extent and without using a flash extent.

Exemplary Embodiments

Figure 1:
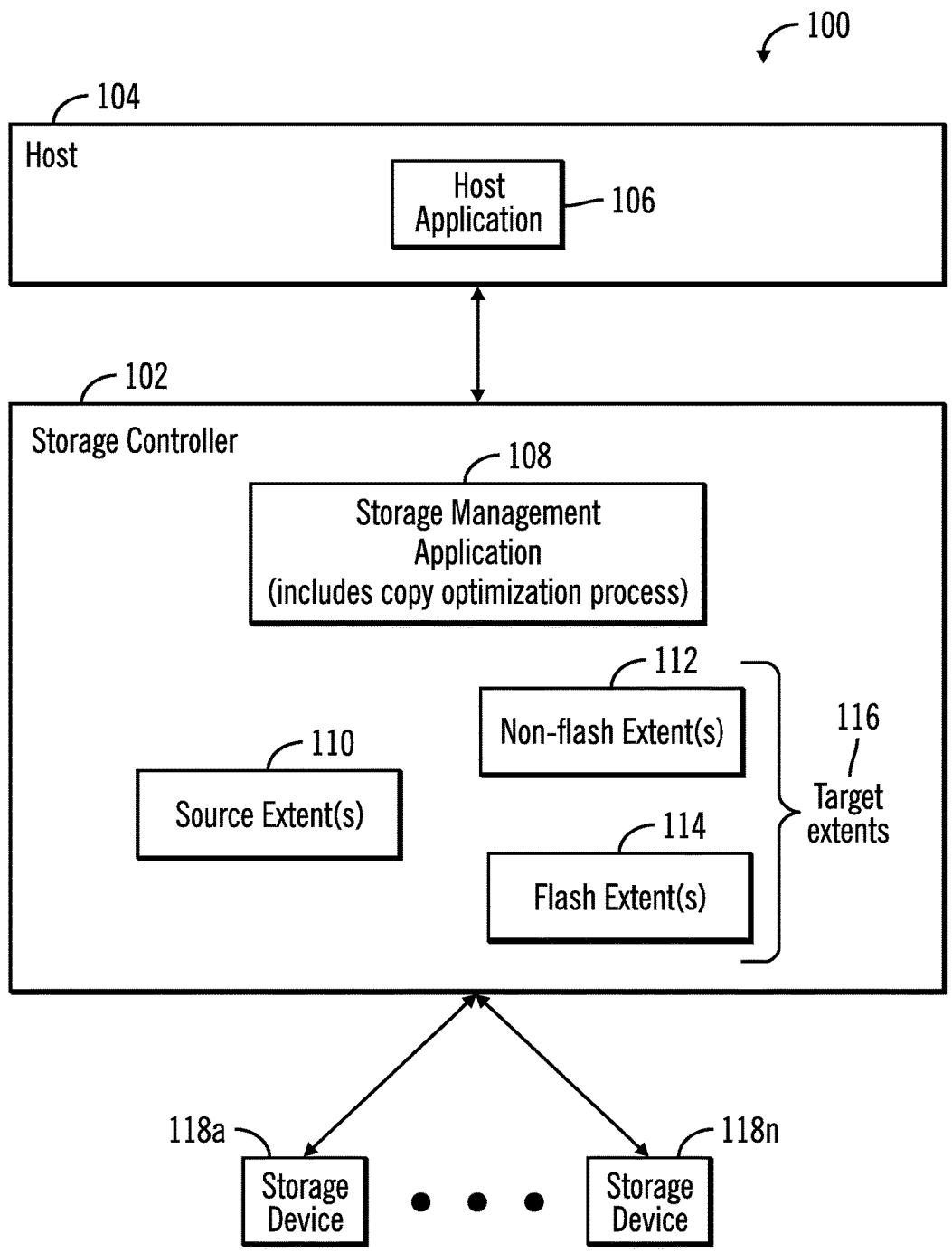
FIG. 1 illustrates a block diagram of a computing environment comprising a storage controller coupled to a host, in accordance with certain embodiments.

FIG. 1 illustrates a block diagram of a computing environment 100 comprising a storage controller 102 coupled to a host 104 via a network or a direct link, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a suitable network such as the Internet, an intranet, a storage area network, etc. A host application 106 executes in the host 104 and a storage management application 108 executes in the storage controller 102, where the host application 106 and the storage management application 108 may be implemented in software, hardware, firmware or any combination thereof. The storage management application 108 may include a process for copy optimization, where the process for copy optimization manages how source extents 110 are copied to one or more extents 112, 114 where extent 112 is a non-flash extent and extent 114 is a flash extent. The non-flash extent 112 and/or the flash extent 114 may be target extents 118 of the source extents 110, where a source and a target extent may be in a point-in-time copy relationship.

The storage controller 102 controls access to one or more storage devices 118a . . . 118n that are coupled to the storage controller 102. The storage devices 1148 . . . 118n may include any suitable storage devices such as magnetic disk drives, tape drives, solid state drives (i.e., flash drives), nearline storage, etc.

The non-flash extent 112 takes a longer time to respond to input/output (I/O) operations in comparison to the flash extent 114. For example, the flash extent 114 may be stored in a solid state drive and the non-flash extent 112 may be stored in nearline storage. In certain embodiments, the storage management application 108 makes a determination as to whether to use the non-flash extent 112 or the flash extent 114 as the target extent of a source extent 110 when change-recorded data has to be propagated to the target extent, where the determination may be based on calculating whether using the flash extent 114 or the non-flash extent 112 as the target extent improves system performance. It should be noted that there may be significantly more non-flash extents 112 in comparison to flash extents 114, as flash extents 114 may be relatively more expensive than non-flash extents 112 that are maintained in nearline storage or disk storage. If a non-flash extent is already in a copy relationship with a source extent and only a very small amount of data changes in the source extent, then it may be better to continue to use the non-flash extent as the target extent by copying the small amount of changes over to the non-flash extent than to copy both changed and unchanged data to a flash extent and make the flash extent the target extent.

Figure 2:
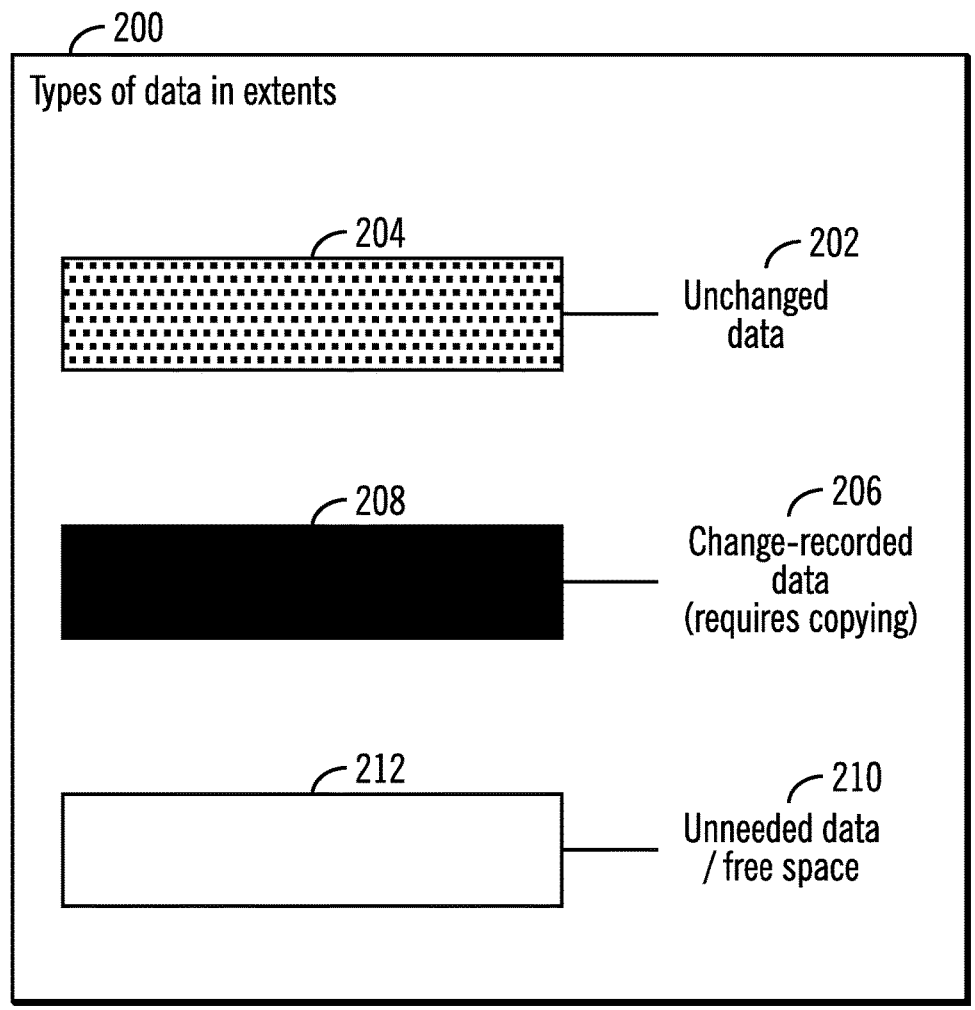
FIG. 2 illustrates a block diagram that shows the different types of data in extents, in accordance with certain embodiments.

FIG. 2 illustrates a block diagram 200 that shows the different types of data in extents, in accordance with certain embodiments. Unchanged data 202 is shown via light shading 204. Change-recorded data (i.e., data that has changed in the source extent since a point-in-time copy of a source extent to a target extent) 206 is shown in black, and unneeded data or free space is shown in white 112.

Figure 3:
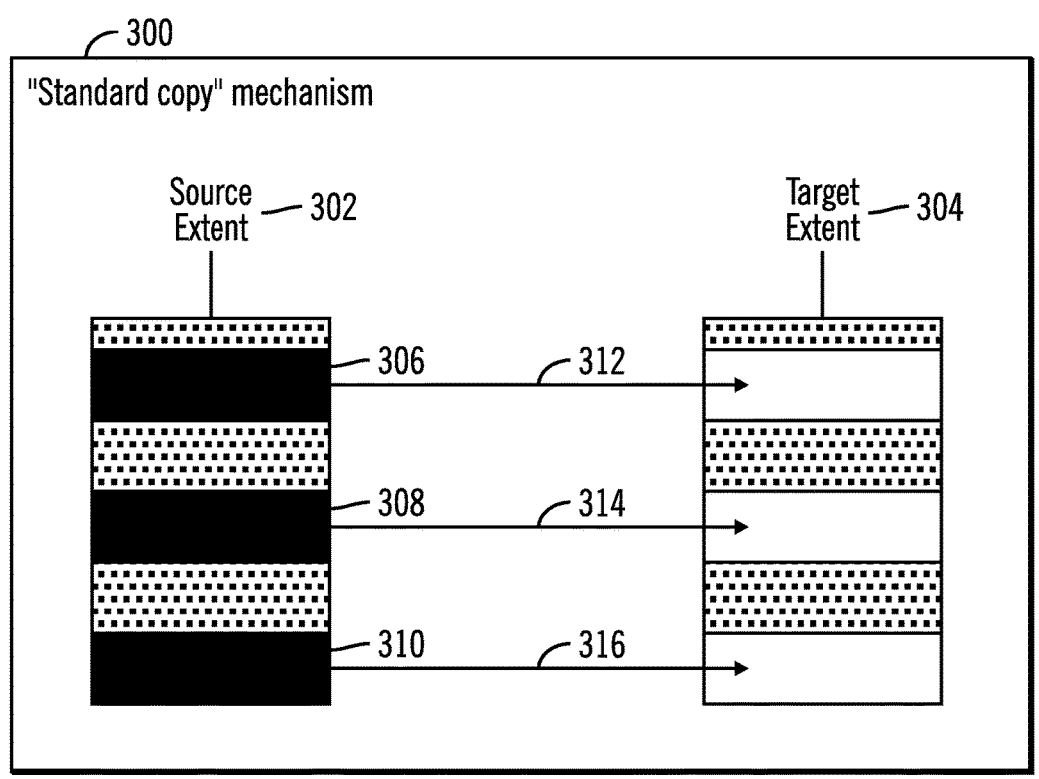
FIG. 3 illustrates a block diagram that shows a standard copy mechanism, in accordance with certain embodiments.

FIG. 3 illustrates a block diagram 300 that shows a "standard copy" mechanism, in accordance with certain embodiments. In FIG. 3, a source extent 302 and a target extent 304 are in a point-in-time copy relationship, i.e., the data in the source extent 302 has been undergone a point-in-time copying to the target extent 304. Subsequently, areas 306, 308, 310 of the source extent 302 may have new data written on them. In a standard copy mechanism the new data 306, 308, 310 is copied over to the target extent 304 as shown via the arrows 312, 314, 316.

Figure 4:
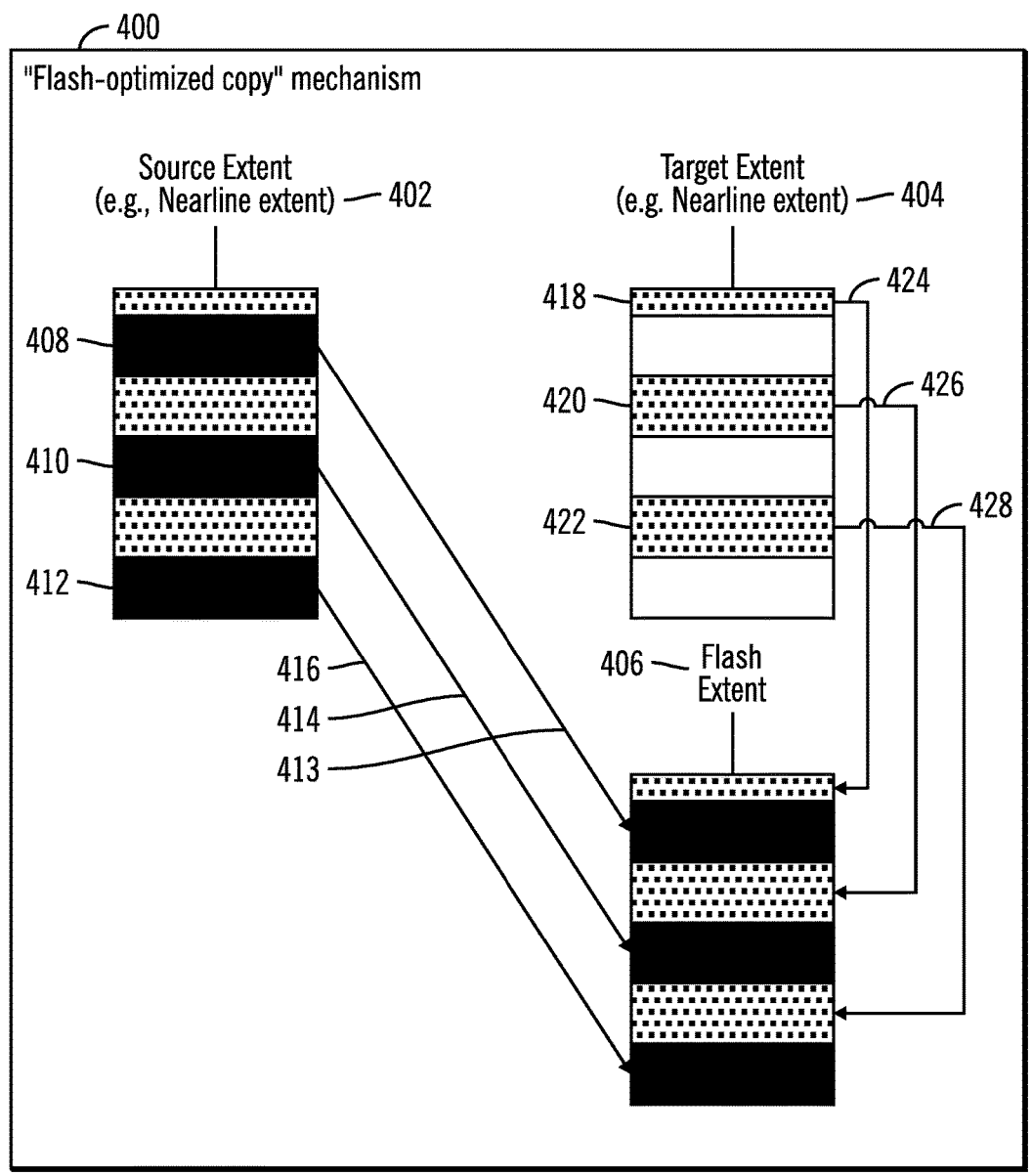
FIG. 4 illustrates a block diagram that shows a flash-optimized copy mechanism, in accordance with certain embodiments.

FIG. 4 illustrates a block diagram 400 that shows a flash-optimized copy mechanism, in accordance with certain embodiments.

In FIG. 4 the source extent 402 is in a point-in-time copy relationship with a target extent 404, where the source extent 402 and the target extent 404 are stored in nearline storage. A flash extent 406 with adequate empty space is also available in the system to make the flash extent 406 into the target extent of the source extent 402.

In certain embodiments, when change-recorded data 408, 410, 412 is placed in the source extent 402, then the storage management application 108 may copy (413, 414, 416) the change-recorded data to the flash extent 406, and also copy the other data (the unchanged data 418, 420, 422) top the flash extent 406 (the copying is shown via reference numerals 424, 426, 428). Once the change-recorded data 408, 410, 412 and the unchanged data 418, 420, 422 have been copied to the flash extent 406, the flash extent 406 is assigned as the target extent of the source extent, and the target extent designation of the nearline extent 404 is removed. This type of copying is referred to as a "flash-optimized" copy mechanism.

Figure 5:
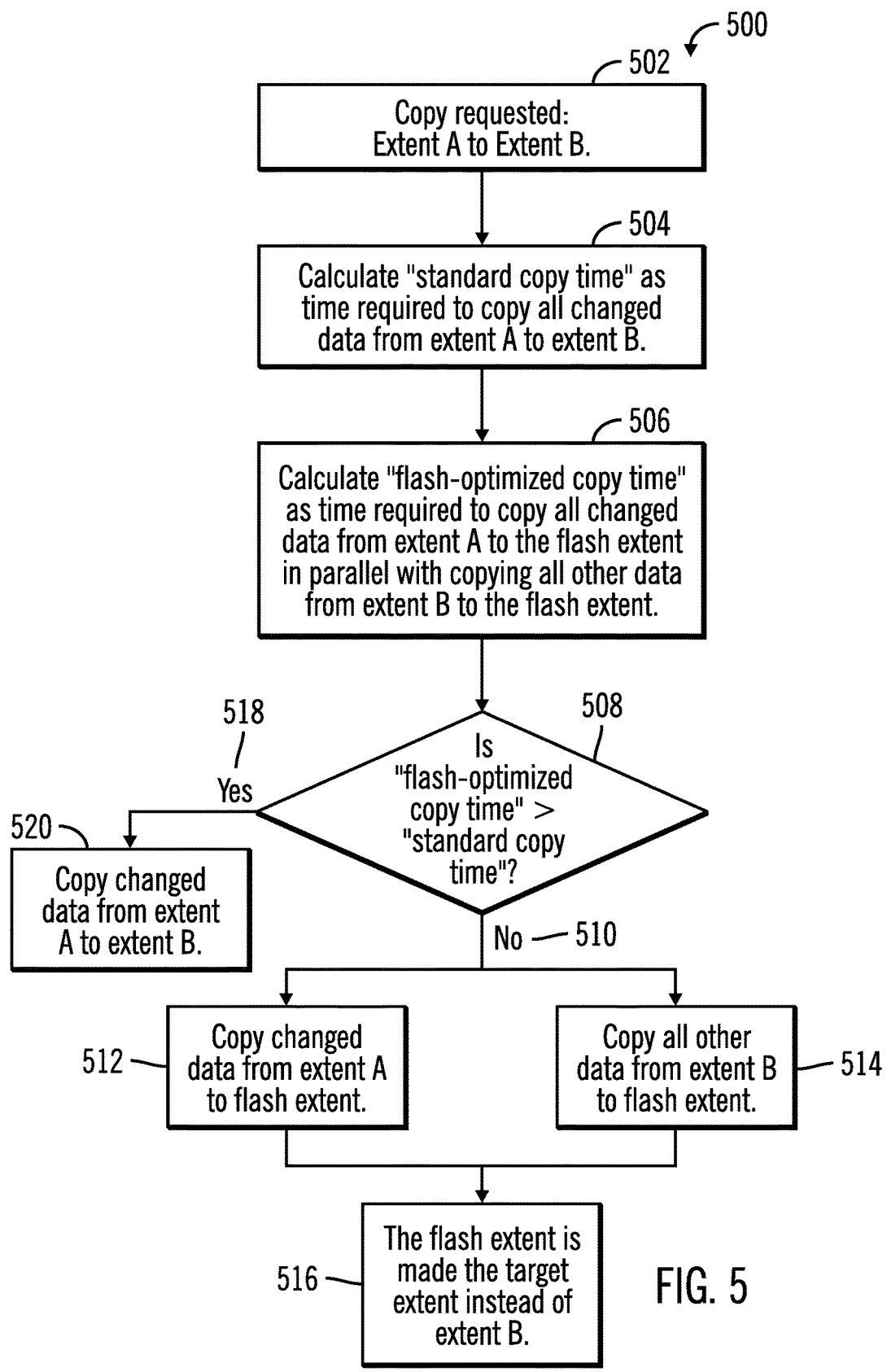
FIG. 5 illustrates a first flowchart that shows the optimization of a copy mechanism by using spare flash cache, in accordance with certain embodiments.

FIG. 5 illustrates a first flowchart 500 that shows the optimization of a copy mechanism by using spare flash cache, in accordance with certain embodiments. The operations shown in FIG. 5 may be performed by the storage management application 108 that executes in the storage controller 102.

Control starts at block 502 in which the storage controller 102 receives a request from the host application 106 to copy extent A to extent B, where both extent A and extent B may both be extents stored in nearline storage which has a slower response time than a flash extent that is stored in flash storage. Extent A (source extent) and extent B (target extent) are in a copy relationship, and some data has changed (i.e., change-recorded data) in extent A that is still not reflected in extent B.

Control proceeds to block 504 in which the storage controller 102 calculates the "standard copy time" as the time required to copy all changed data from extent A to extent B. Then the storage controller 102 calculates (at block 506) the "flash-optimized copy time" as the time required to copy all changed data from extent A to the flash extent in parallel with copying all other data from extent B to the flash extent.

Control then proceeds to block 508 in which the storage controller 102 determines whether the "flash-optimized copy time" is greater than the "standard copy time". If not ("No" branch 510), control proceeds in parallel to blocks 512 and 514, where in block 512 the changed data is copied from extent A to the flash extent, and in block 514 all other data (i.e., unchanged data) is copied from extent B to the flash extent.

Once the operations shown in block 512 and 514 are both over, the storage controller 102 designates (at block 516) the flash extent into the target extent instead of extent B.

If at block 508 in the storage controller 102 determines that the "flash-optimized copy time" is greater than the "standard copy time" ("Yes" branch 518), control proceeds to block 520 in which the storage controller 102 copies the changed data from extent A to extent B.

Therefore, FIG. 5 illustrates embodiments in which if time is saved by using the flash extent then the flash extent is used as the target extent, and if no time is saved by using the flash extent then extent B (non-flash extent that is less responsive to I/O than the flash extent) continues to be used as the target extent.

Figure 6:
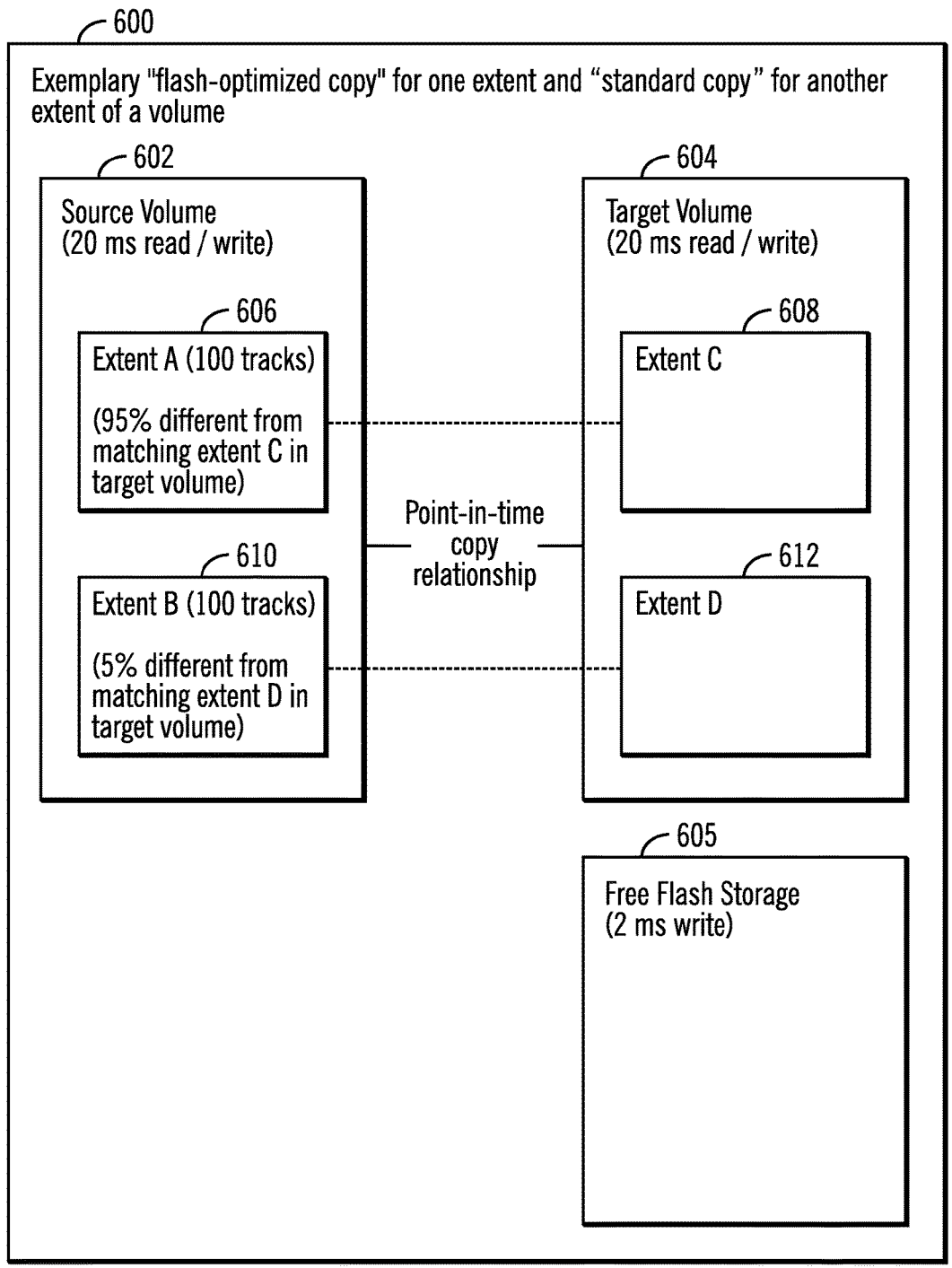
FIG. 6 illustrates a block diagram that shows a flash-optimized copy mechanism for one extent and a standard copy mechanism for another extent, in accordance with certain embodiments.

FIG. 6 illustrates a block diagram 600 that shows a flash-optimized copy mechanism for one extent and a standard copy mechanism for another extent, in accordance with certain embodiments.

FIG. 6 shows two volumes 602, 604 each of which have two extents. These two volumes are called "Source Volume" 602 and "Target Volume" 5604. Each extent has 100 tracks in it. All extents of all volumes exist on nearline storage which takes 20 ms. for read and/or write operations. There is a significant amount of free flash storage 605 which takes 2 ms. for write operations.

There exists a point-in-time copy relationship going from source volume 602 to target volume 604. There has been I/O to the source volume 602 after the point-in-time copy was formed causing the first extent (extent A 606) of the source volume to be 95% different than the matching extent (Extent C 608) of the target volume 604, and the second extent (Extent B 610) to be 5% different than the matching extent (extent D 612) of the target volume 604.

At this point, the user may initiate a fast reverse restore on the point-in-time copy relationship to restore data. The following calculations may be performed for each of the two extents:

Extent 1 (i.e., extent A 606): Standard copy time=(20 ms read from Source Volume+20 ms write to Target Volume) *95 tracks=3800 ms; and Flash-optimized copy time=(20 ms read from Source Volume+2 ms write to Target Volume) *100 tracks=2200 ms.

Extent 2 (extent B 610): Standard copy time=(20 ms read from Source Volume+20 ms write to Target Volume)*5 tracks=200 ms; and Flash-optimized copy time=(20 ms read from Source Volume+2 ms write to Target Volume)*100 tracks=2200 ms.

In the above case, extent 1 (i.e., extent A 606) uses the flash-optimized copy and extent 2 (i.e., extent 610) uses the standard copy. The saving seen by introducing flash-optimized copy in this case may be 40% faster, as the optimized mechanism takes 2400 ms. and the non-optimized mechanism takes 4000 ms.

Figure 7:
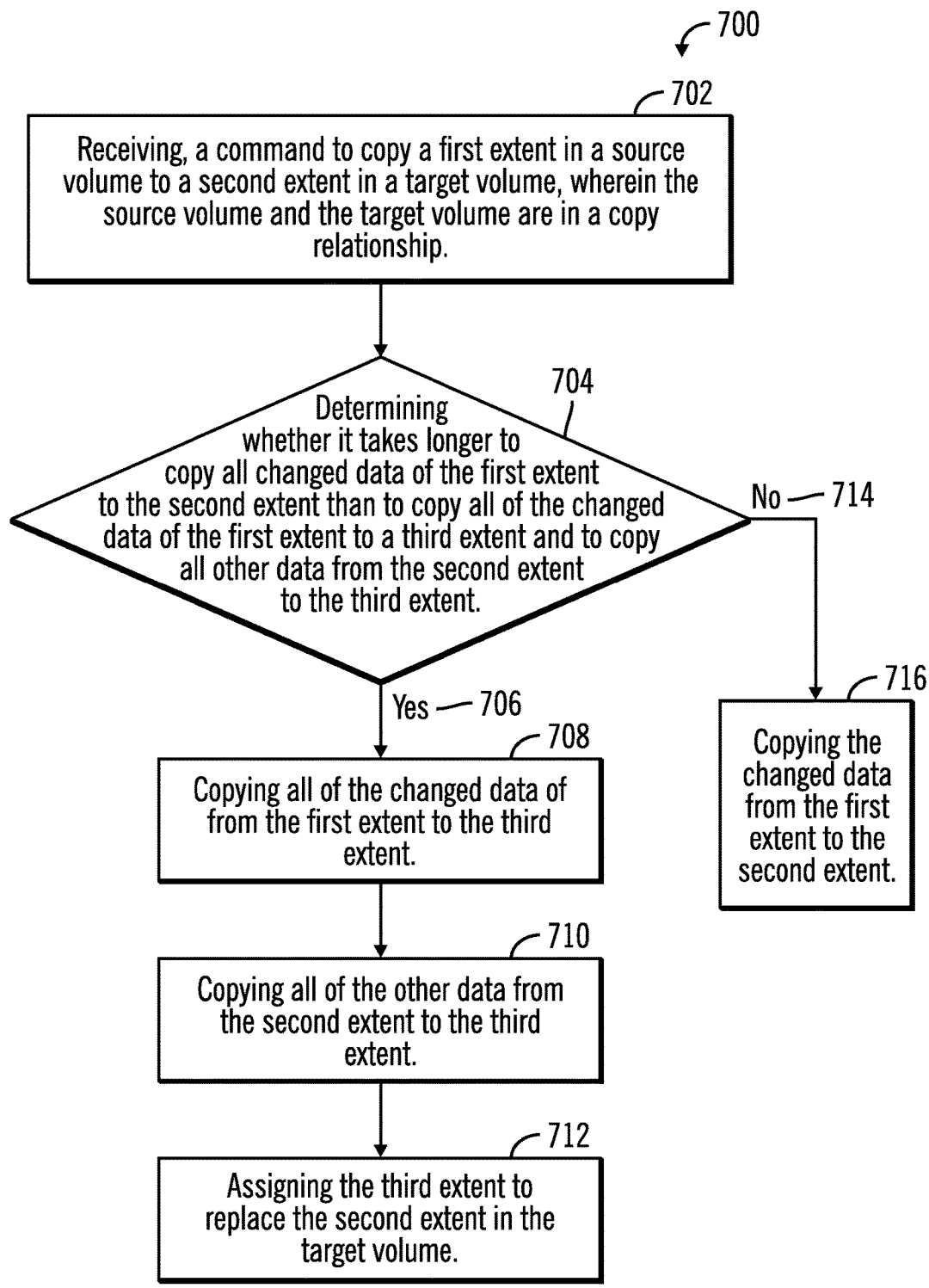
FIG. 7 illustrates a second flowchart that shows the optimization of a copy mechanism by using spare flash cache, in accordance with certain embodiments.

FIG. 7 illustrates a second flowchart 700 that shows the optimization of a copy mechanism by using spare flash cache, in accordance with certain embodiments. The operations shown in FIG. 7 may be performed by the storage management application 108 that executes in the storage controller 102.

Control starts at block 702 in which a command is received by the storage controller 102 to copy a first extent 110 (e.g., a nearline extent) in a source volume to a second extent 112 (e.g. a nearline extent) in a target volume, where the source volume and the target volume are in a copy relationship. Control proceeds to block 704 in which the storage controller 102 determines whether it takes longer to copy all changed data of the first extent to the second extent than to copy all of the changed data of the first extent to a third extent 114 (e.g., a flash extent) and to copy all other data from the second extent to the third extent.

In response to determining that it takes longer to copy all changed data of the first extent to the second extent than to copy all of the changed data of the first extent to a third extent and to copy all other data from the second extent to the third extent ("Yes" branch 706 from block 704), operations are performed to copy all of the changed data of from the first extent to the third extent (block 708) and to copy all of the other data from the second extent to the third extent (block 710). Operations are also performed (block 712) to assign the third extent to replace the second extent in the target volume.

In response to determining that it takes longer to copy all of the changed data of the first extent to the third extent and to copy all of the other data from the second extent to the third extent than to copy all of the changed data of the first extent to the second extent ("No" branch 714 from block 704), the changed data from the first extent is copied to the second extent (block 716).

Figure 8:
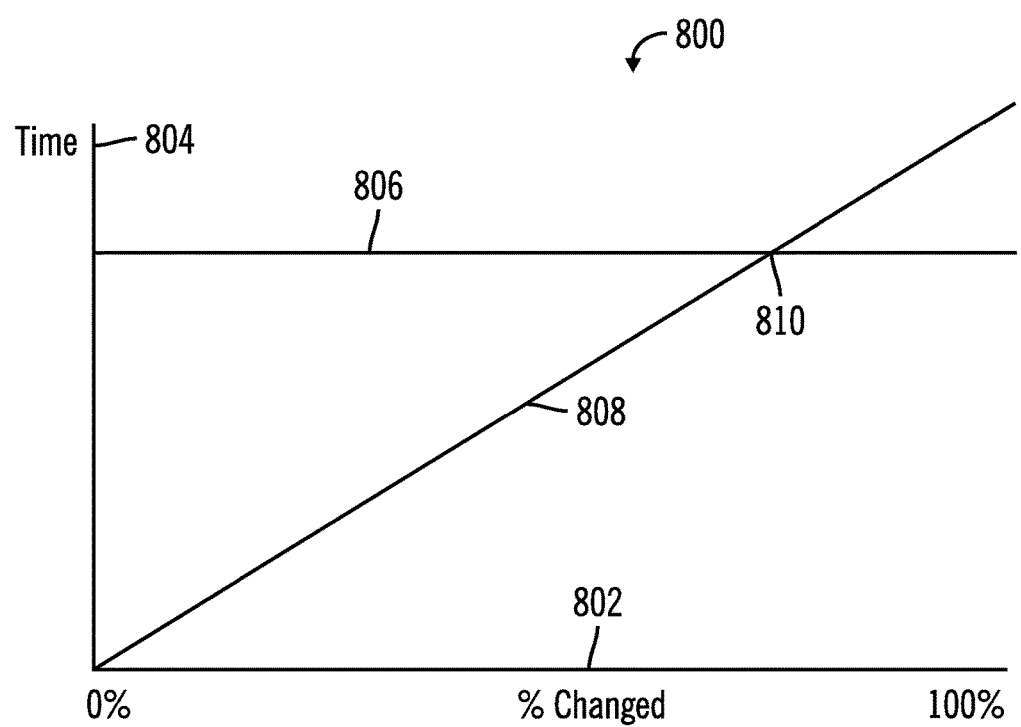
FIG. 8 provides a graphical illustration that shows that at some point there is a breakeven point to copying data to better speed tier and the cost of copying data.

FIG. 8 provides a graphical illustration 800 that shows that at some point there is a breakeven point to copying data to better speed tier and the cost of copying data. In FIG. 8 the horizontal axis 802 shows the amount of changed data and the vertical axis 804 the time required for copying the changed data. The line 806 shows the time required for copying (via standard copy) the changed data when the third extent (residing in the better speed tier, e.g., flash memory) is not used for the copying, and the line 808 shows the time required for copying (via flash-optimized copy) the changed data when the third extent (stored in the better speed tier) is used for the copying. It can be seen that beyond the breakeven point 810 (i.e., when a greater percentage of data has changed) it may be better not to use the third extent for the copying. In other words, beyond the breakeven point 810 (i.e., when a greater percentage of data has changed) the cost of flash-optimized copy exceeds the cost of standard copy and the flash-optimized copy is not to be used.

Therefore FIGS. 1-8 illustrate certain embodiments in which depending on the latencies of available extents that may serve as a target extent for a source extent, a suitable available extent may be assigned as a new target volume over an existing target extent.

In further embodiments, a determination is made as to whether a tier of storage in which the third extent (i.e., the flash extent 114) resides has enough space to allocate the third extent with adequate space to allow copying of all of the changed data of from the first extent (e.g., nearline based source extent 110) to the third extent (i.e., flash extent) and the copying of all of the other data (i.e., unchanged data) from the second extent (target nearline extent) to the third extent (flash extent), prior to performing the copying of all of the changed data from the first extent to the third extent and the copying of all of the other data from the second extent to the third extent.

In still further embodiments, the first extent is maintained in a first type of storage, the second extent is maintained in a second type of storage, and the third extent is maintained in a third type of storage, wherein the third type of storage has a faster response time for reads and writes in comparison to the first type of storage or the second type of storage. In additional embodiments, the first type of storage and the second type of storage are nearline storage, and the third type of storage is flash storage. In certain embodiments, the first type of storage may be any type of storage, the second type of storage is nearline storage, and the third type of storage is flash storage.

In further embodiments, the source volume has a plurality of extents, wherein the extents of the source volume are copied to at least two different types of storage that have different response times for reads and writes. In certain embodiments, based on the percentage of changed data in the first extent, the first extent is copied to the second extent or the third extent, wherein the copy relationship is a point-in-time copy relationship. The larger the percentage of data that is change-recorded data the higher the likelihood that the flash-optimized copy will improve the copying performance.

In certain alternative embodiments, both the source and target extents exist on the same storage system. In this case, if there are very few similarities between the extents there is a case where updating the source volume to just point at the target extent in place of the existing source extent may be much faster. The target volume, needing a new extent may then also be pointed at the old source extent to maintain its capacity. This may be done if the restore process being optimized may leave the target volume's data in an unusable state.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
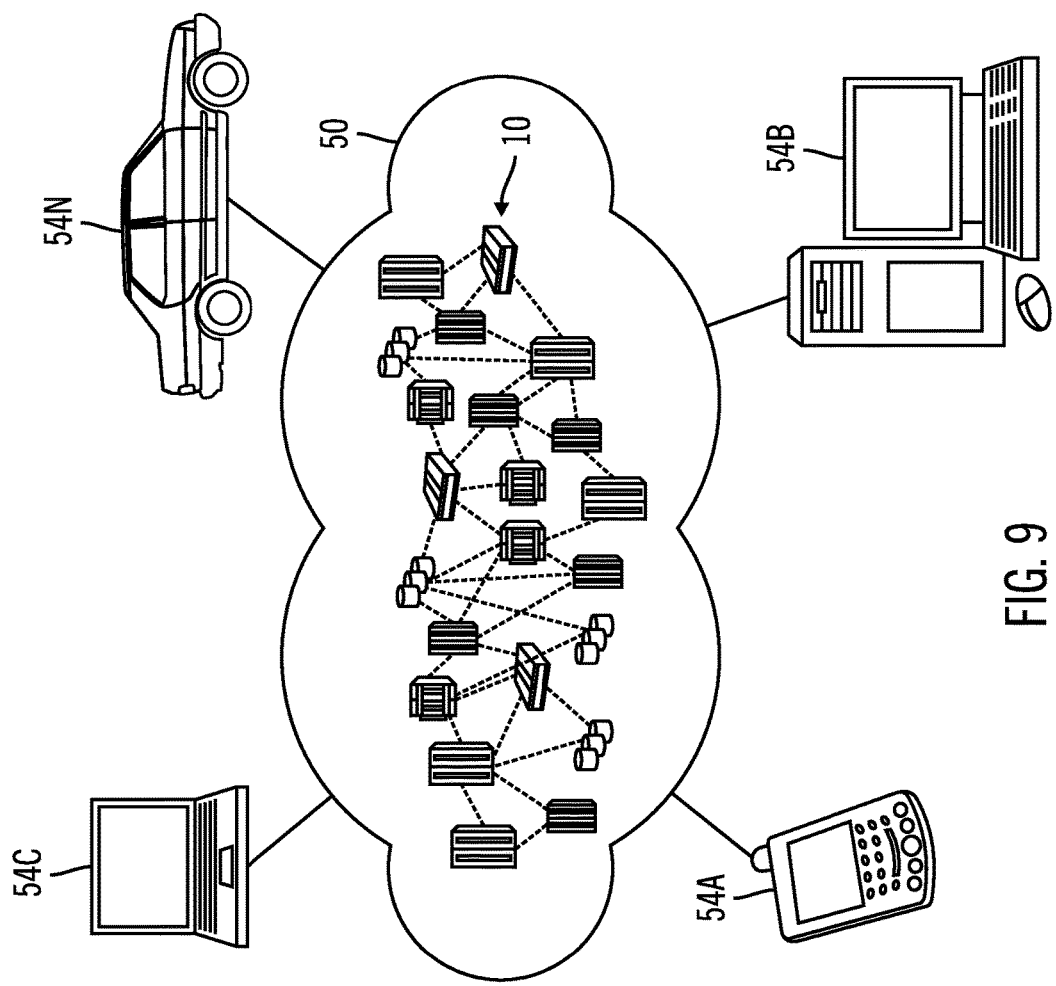
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
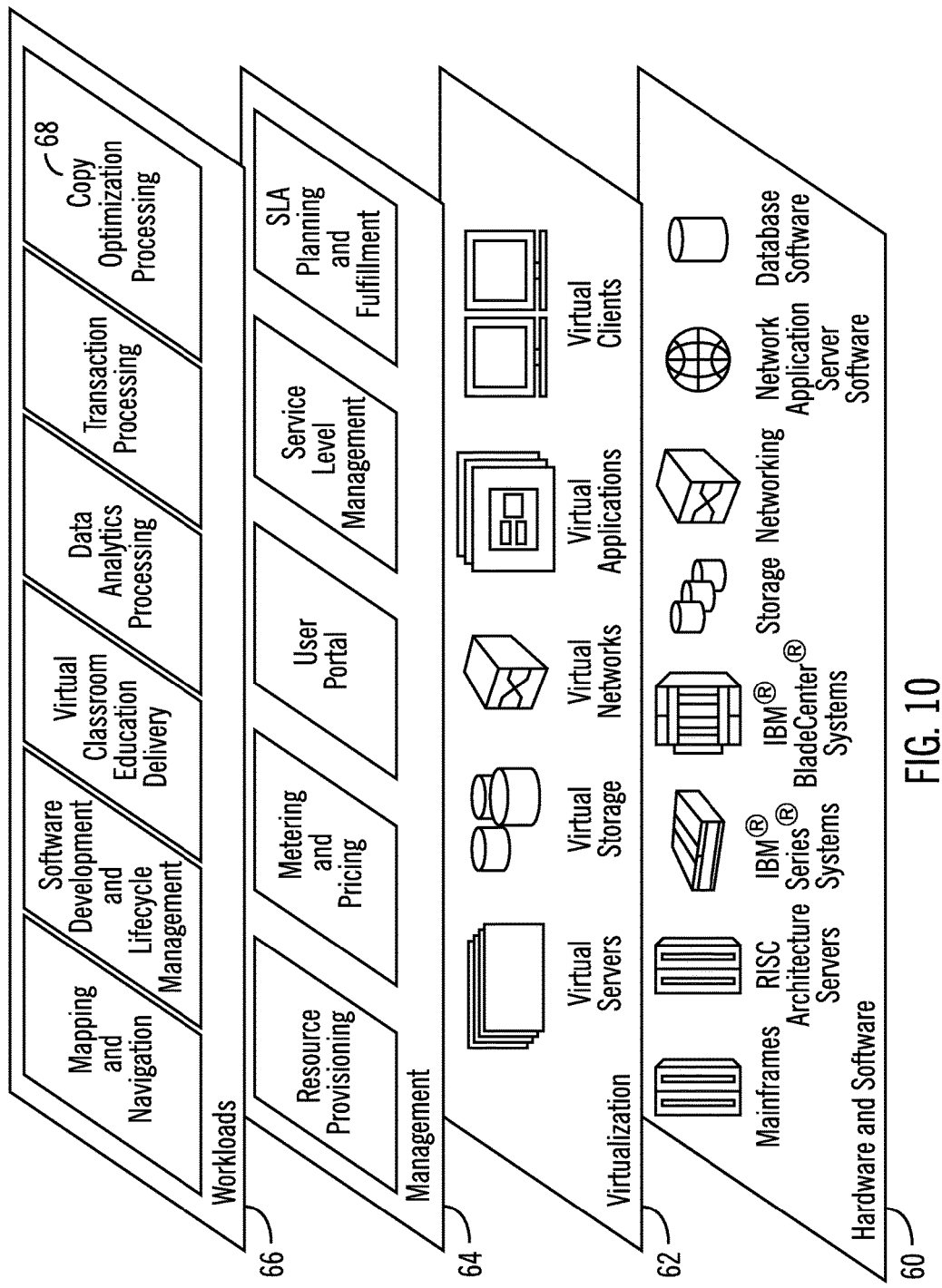
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the copy optimization processing applications (e.g., the storage controller application 108) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
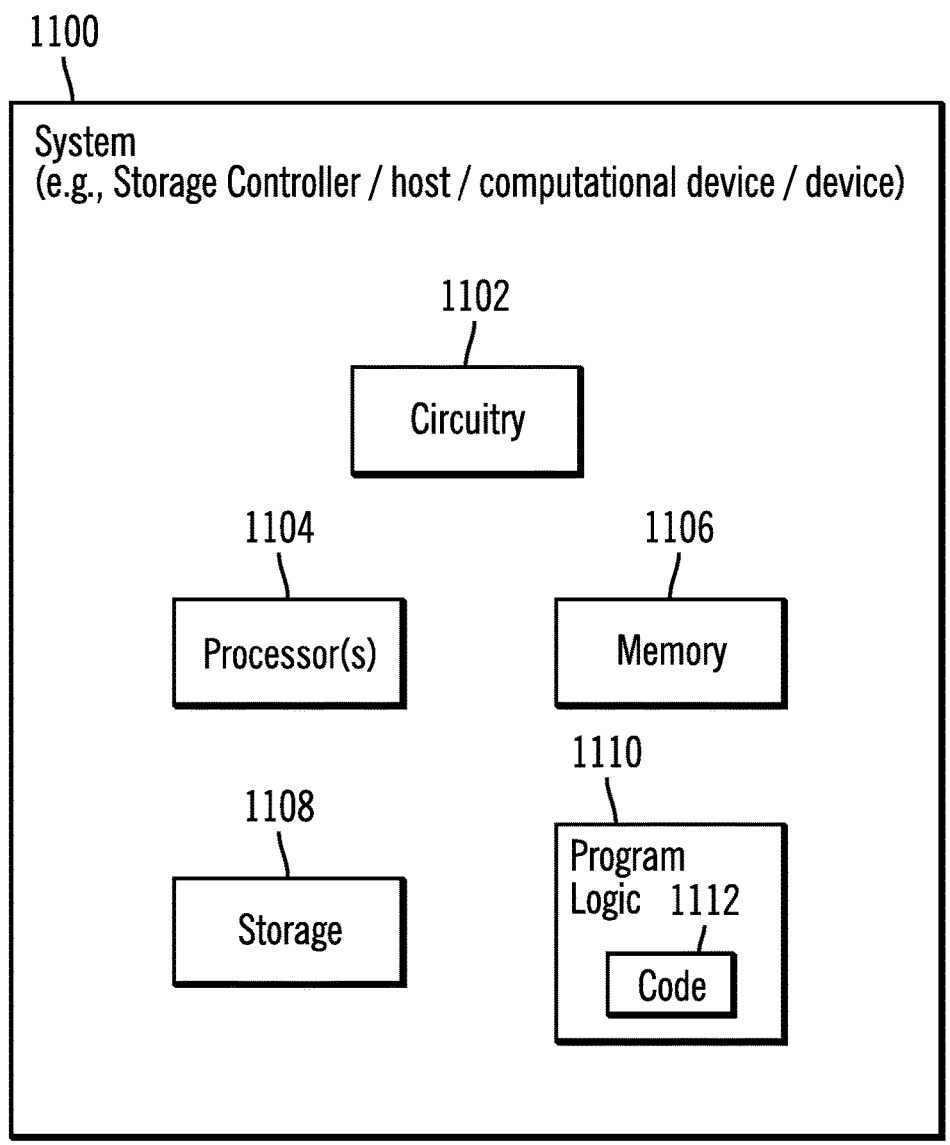
FIG. 11 illustrates a block diagram of a computational system that shows certain elements that may be included in the storage controller or the host shown in FIG. 1, in accordance with certain embodiments.

FIG. 11 illustrates a block diagram that shows certain elements that may be included in the host 114 or storage controller 112 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   receiving, a command to copy a first extent in a source volume to a second extent in a target volume, wherein the source volume and the target volume are in a copy relationship;
   calculating a first copy time as a time required to copy a changed data of the first extent, from the first extent to the second extent;
   calculating a second copy time as a time required to copy the changed data of the first extent from the first extent to a third extent in parallel with copying all other data from the second extent to the third extent;
   in response to determining that the first copy time is greater than the second copy time, performing:
   copying the changed data from the first extent to the third extent;
   in parallel to the copying of the changed data of the first extent to the third extent, copying all of the other data from the second extent to the third extent; and
   subsequent to completion of the copying of the changed data from the first extent to the third extent, and the copying of all of the other data from the second extent to the third extent, assigning the third extent to replace the second extent in the target volume.

2. The method of claim 1, the method further comprising:
   in response to determining that the first copy time is greater than the second copy time, copying the changed data from the first extent to the second extent.

3. The method of claim 1, wherein the first extent is maintained in a first type of storage, the second extent is maintained in a second type of storage, and the third extent is maintained in a third type of storage, and wherein the third type of storage has a faster response time for reads and writes in comparison to the first type of storage or the second type of storage.

4. The method of claim 3, wherein the second type of storage is nearline storage or some other type of storage, and the third type of storage is flash storage or another type of storage that has a lower latency than the second type of storage.

5. The method of claim 1, wherein the source volume has a plurality of extents, and wherein the extents of the source volume are copied to at least two different types of storage that have different response times for reads and writes.

6. The method of claim 1, wherein based on a percentage of changed data in the first extent, the first extent is copied to the second extent or the third extent, and wherein the copy relationship is a point-in-time copy relationship.

7. A system, comprising:
a memory; and
a processor coupled to the memory, wherein the processor performs operations, the operations comprising:
receiving, a command to copy a first extent in a source volume to a second extent in a target volume, wherein the source volume and the target volume are in a copy relationship;
calculating a first copy time as a time required to copy a changed data of the first extent, from the first extent to the second extent;
calculating a second copy time as a time required to copy the changed data of the first extent from the first extent to a third extent in parallel with copying all other data from the second extent to the third extent;
in response to determining that the first copy time is greater than the second copy time, performing:
copying the changed data from the first extent to the third extent;
in parallel to the copying of the changed data of the first extent to the third extent, copying all of the other data from the second extent to the third extent; and
subsequent to completion of the copying of the changed data from the first extent to the third extent, and the copying of all of the other data from the second extent to the third extent, assigning the third extent to replace the second extent in the target volume.

8. The system of claim 7, the operations further comprising:
in response to determining that the first copy time is greater than the second copy time, copying the changed data from the first extent to the second extent.

9. The system of claim 7, wherein the first extent is maintained in a first type of storage, the second extent is maintained in a second type of storage, and the third extent is maintained in a third type of storage, and wherein the third type of storage has a faster response time for reads and writes in comparison to the first type of storage or the second type of storage.

10. The system of claim 9, wherein the second type of storage is nearline storage or some other type of storage, and the third type of storage is flash storage or another type of storage that has a lower latency than the second type of storage.

11. The system of claim 7, wherein the source volume has a plurality of extents, and wherein the extents of the source volume are copied to at least two different types of storage that have different response times for reads and writes.

12. The system of claim 7, wherein based on a percentage of changed data in the first extent, the first extent is copied to the second extent or the third extent, and wherein the copy relationship is a point-in-time copy relationship.

13. A computer program product, the computer program product comprising:
a computer readable storage medium having computer readable program code embodied therewith, the computer readable program code configured to perform operations on a processor, the operations comprising:
receiving, a command to copy a first extent in a source volume to a second extent in a target volume, wherein the source volume and the target volume are in a copy relationship;
calculating a first copy time as a time required to copy a changed data of the first extent, from the first extent to the second extent;
calculating a second copy time as a time required to copy the changed data of the first extent from the first extent to a third extent in parallel with copying all other data from the second extent to the third extent;
in response to determining that the first copy time is greater than the second copy time, performing:
copying the changed data from the first extent to the third extent;
in parallel to the copying of the changed data of the first extent to the third extent, copying all of the other data from the second extent to the third extent; and
subsequent to completion of the copying of the changed data from the first extent to the third extent, and the copying of all of the other data from the second extent to the third extent, assigning the third extent to replace the second extent in the target volume.

14. The computer program product of claim 13, the operations further comprising:
in response to determining that the first copy time is greater than the second copy time, copying the changed data from the first extent to the second extent.

15. The computer program product of claim 13, wherein the first extent is maintained in a first type of storage, the second extent is maintained in a second type of storage, and the third extent is maintained in a third type of storage, and wherein the third type of storage has a faster response time for reads and writes in comparison to the first type of storage or the second type of storage.

16. The computer program product of claim 15, wherein the second type of storage is nearline storage or some other type of storage, and the third type of storage is flash storage or another type of storage that has a lower latency than the second type of storage.

17. The computer program product of claim 13, wherein the source volume has a plurality of extents, wherein the extents of the source volume are copied to at least two different types of storage that have different response times for reads and writes, and wherein based on a percentage of changed data in the first extent, the first extent is copied to the second extent or the third extent, and wherein the copy relationship is a point-in-time copy relationship.

18. The method of claim 1, wherein if a percentage of data that has changed in the first extent exceeds a breakeven number, then the second copy time exceeds the first copy time.

19. The system of claim 7, wherein if a percentage of data that has changed in the first extent exceeds a breakeven number, then the second copy time exceeds the first copy time.

20. The computer program product of claim 13, wherein if a percentage of data that has changed in the first extent exceeds a breakeven number, then the second copy time exceeds the first copy time.

* * * * *